(12) United States Patent
Brivois

(10) Patent No.: US 10,926,946 B2
(45) Date of Patent: Feb. 23, 2021

(54) CAPSULE FOR PREPARING A BEVERAGE

(71) Applicant: BRAIN CORP SA, Bergem (LU)

(72) Inventor: Olivier Brivois, Paris (FR)

(73) Assignee: Brain Corp SA, Bergem (LU)

( * ) Notice: Subject to any disclaimer, the term of this patent is extended or adjusted under 35 U.S.C. 154(b) by 309 days.

(21) Appl. No.: 15/752,303

(22) PCT Filed: Aug. 12, 2016

(86) PCT No.: PCT/EP2016/069222
§ 371 (c)(1),
(2) Date: Feb. 13, 2018

(87) PCT Pub. No.: WO2017/025622
PCT Pub. Date: Feb. 16, 2017

(65) Prior Publication Data
US 2019/0047783 A1   Feb. 14, 2019

(30) Foreign Application Priority Data

Aug. 13, 2015 (LU) .......................................... 92799
Sep. 1, 2015 (LU) .......................................... 92810
Aug. 12, 2016 (WO) ................. PCT/EP2016/069222

(51) Int. Cl.
*B65D 85/804* (2006.01)
*A47J 31/40* (2006.01)
(Continued)

(52) U.S. Cl.
CPC ...... *B65D 85/8046* (2013.01); *A47J 31/0668* (2013.01); *A47J 31/407* (2013.01);
(Continued)

(58) Field of Classification Search
CPC ............ B65D 85/8046; B65D 85/8043; B29C 45/14467; B29C 45/14418;
(Continued)

(56) References Cited

U.S. PATENT DOCUMENTS

2015/0375928 A1* 12/2015 Galv O .............. B65D 85/8043
426/115

FOREIGN PATENT DOCUMENTS

EP         512468 B1    5/1992
EP        1784344 B1    4/2009
(Continued)

*Primary Examiner* — John C Hong
(74) *Attorney, Agent, or Firm* — Renner Kenner Greive Bobak Taylor and Weber

(57) ABSTRACT

Capsule intended for receiving a substance for preparing a beverage using a coffee machine or infusion machine, to be held by a piston during the passage of the extracting liquid after piercing of the base by the pins of the piston. The capsule made from injected plastic material has a base (1) and a side wall (3) together forming part of a frustrum of a cone, as well as a rim (4) covered by a lid (5) after the filling of the capsule with the substance. The side wall (2) is shaped as a single cone frustrum between the rim (3) and the open (12) base (1), formed as a flattened ring (11), connected to the side wall (2). The side wall (2) is covered by a label (23) and the open base (1), including the ring (11) thereof, is covered by a sealed lid (14) inside the base.

18 Claims, 9 Drawing Sheets

(51) Int. Cl.
  *B65B 29/02* (2006.01)
  *A47J 31/06* (2006.01)
  *B29C 45/14* (2006.01)
(52) U.S. Cl.
  CPC .. *B29C 45/14418* (2013.01); *B29C 45/14467* (2013.01); *B65B 29/022* (2017.08); *B65B 29/025* (2017.08); *B65D 85/8043* (2013.01); *B29C 45/14262* (2013.01); *B29C 45/14778* (2013.01)
(58) Field of Classification Search
  CPC .......... B29C 45/14262; B29C 45/14778; A47J 31/407; A47J 31/0668; B65B 29/022; B65B 29/025
  See application file for complete search history.

(56) References Cited

FOREIGN PATENT DOCUMENTS

| EP | 2062831 | B1 | | 5/2009 | |
|---|---|---|---|---|---|
| EP | 2134611 | B1 | | 12/2009 | |
| EP | 2284101 | A1 | | 2/2011 | |
| WO | WO-2013026651 | A1 | * | 2/2013 | ............. B65D 81/18 |

* cited by examiner

CAPSULE FOR PREPARING A BEVERAGE

DOMAIN OF THE INVENTION

The invention herein pertains to a capsule intended to accommodate a substance for the preparation of a beverage when the capsule is installed in the housing of a machine such as a coffee or infusion machine, to be held by a piston during the passage of the extractor liquid through the capsule and the substance that it contains, after the penetration of the bottom by the studs of the piston, with the inject-molded plastic capsule having a bottom and a side wall essentially fitting within a cone frustum and an edge covered by a membrane seal after the substance is loaded into the capsule.

STATE OF THE ART

There are multiple forms of implementation of capsules for coffee or infusion machines. All have the purpose of allowing the preparation of a high-quality beverage.

Yet the quality of the beverage obtained depends not only on the quality and the nature of the product used for its preparation (coffee or infusion) but, importantly, also depends on the conservation of the product within the capsule, and its protection from the ambient air.

This is because the capsules are generally made of plastic, which is more or less porous by nature. Certainly, there are plastics that are impermeable to gases and that properly protect the content of the capsule, but they are relatively costly and difficult to injection-mold.

Another solution for protecting the content of a capsule is to wrap it in an oxygen-impermeable packaging. But this solution increases the quantity of waste, namely the packaging, the capsule and its various component parts, meaning that its production is relatively costly, even if the packaging is automated. There is also the problem of pollution through the quantity of component parts thrown away as trash.

Such a capsule in a packaging is not very practical to use, as one first has to open the packaging which, being sealed, does not open easily by nature. In addition, the product thus packaged is relatively voluminous on an individual basis, which gives rise to transportation costs and a carbon footprint.

Purpose of the Invention

The purpose of the invention herein is to remedy the disadvantages of known capsules, and proposes the development of a sealed capsule produced using simple means, cost-effectively, that is easy to manufacture and use and that enables per-unit sales while reducing the volume of the packaged product, as well as the quantity of waste after usage of the product.

Explanation and Advantages of the Invention

Therefore, the invention addresses a capsule of the type explained above, characterized by the fact that the side wall is formed from a single cone frustum between the rim and the bottom, with the bottom being flat, formed from an inner crown connected to the side wall and surrounding a central opening, with the side wall being covered with a sealed label, and with the bottom—including its inner crown—being covered with a sealed membrane. According to one advantageous characteristic, the sealed membrane is an inner membrane.

The capsule according to the invention of which the opening is closed by an aluminum membrane seal is rendered impermeable even is if the plastic material of the capsule does not have good impermeability. The sealed label internally covers the bottom, including the crown, by being joined to the label covering the side wall.

Since the top of the capsule is closed by an aluminum membrane seal, the entire capsule thus enclosed is perfectly impermeable, which ensures the proper conservation of the product within the capsule.

The packaging has overall dimensions reduced to just the volume of the capsule. The capsule is particularly practical to use because there is no inner wrap or outer packaging to open, and it can be placed directly in the coffee machine. The waste produced is just the capsule alone.

The capsule can be rendered aesthetically attractive by printing on the label covering the entire side wall and the bottom membrane seal. The affixing of the label is very simple because the side wall is a frustoconical surface extending from the bottom of the rim to the edge of the bottom, such that the label covers the entire lateral surface. The film can advantageously be embellished with a decor and/or markings, such as a brand, a logo, a reference identifying the product, a manufacturing date, and whatever other useful information.

The decoration of the side wall and the bottom enables one to personalize series of capsules, work on the aesthetics, and introduce variations according to a variety of criteria. Lastly, since the capsule is innately sealed, it can be distributed on an individual basis, which allows the mixing of capsules at the moment of purchase, as a function of the variety of coffees or infusions that the consumer may choose.

According to another characteristic, the label and the membrane seal are integrated into the wall and bottom of the capsule by injection molding.

According to another characteristic, the capsule incorporates a cross brace composed of a central hub that is connected to the crown by means of branches that penetrate the volume of the capsule so that it is not touched by the studs.

According to another characteristic, the crown has a flattened frustoconical shape.

According to another characteristic, the label and the membrane seal are made of aluminum foil and a notable feature of the membrane seal is that it is embossed.

According to another characteristic, the label and the membrane seal are made from a complex composed of aluminum (AL) or (EVOH) foil of which the two faces are covered with a plastic film chosen from the group including PP and PLA.

According to another characteristic, the label has a greater height than the height of the side wall, such that the upper edge of the label—the additional length—is incorporated into the rim of the capsule during the injection of the plastic to produce the capsule.

According to another advantageous characteristic, the sealed membrane and the label are made of aluminum foil. This foil can perfectly well be printed upon, to receive decoration and/or technical information. It can also accommodate laser markings such as the expiration date or other information that may vary from one capsule to another, or from one batch of capsules to another.

According to one advantageous characteristic, if the capsule has a form of revolution, the central opening of the bottom is preferably circular.

According to another characteristic, the bottom incorporates an in-turned peripheral rim constituting a stacking bearing surface for stacking empty capsules on the brackets within the capsules. These brackets are oriented in the direction of the generatrix of the surface of the cone frustum, which also constitute reinforcement points that transmit the stresses applied to the membrane seal, which itself is connected to the crown of the bottom near the side wall, so as to prevent compression and deformation of the capsule in the event of unusual resistance of the membrane seal to piercing by one or more studs of the machine.

In a particularly advantageous manner, the inner crown bounding the opening of the bottom has a flat exterior surface and a frustoconical interior surface, to join with the flat frustoconical surface of the opening in which the membrane seal is positioned, without requiring spacers or radial reinforcements that might impede the passage of the machine's stud(s).

The invention also addresses a process for the production of a capsule such as described above, with the process being characterized by the fact that:

one produces a mold for a capsule having a side wall in cone frustum form, endowed with a rim in the large base of the cone frustum, and of which the flat summit of the bottom of the capsule has the form of an inner crown enclosing a central opening;

the mold is composed of one part having a cavity within the form of the frustoconical side wall of the capsule, with the bottom of the corresponding cavity in the bottom of the capsule being endowed with a surface in relief to form the opening of the bottom of the capsule, while the other part of the mold is a core forming the inner surface of the capsule;

in the cavity of the mold, one places a label of a shape matching the shape of the frustoconical side wall, and one then closes the mold and injects the plastic.

According to another characteristic of the process, one places the membrane seal on the core, and one then closes the mold and injects the plastic.

This production process is extremely simple, and results in a capsule that is not only perfectly sealed and manufactured in one single operation, but that is used with great simplicity without risk of the capsule becoming jammed in the machine preparing the beverage.

As the membrane seal covering the bottom is placed in the mold before the injection, the membrane seal is incorporated into the bottom of the capsule when output hot, by cooling alone, such that not only will the membrane seal be joined to the inner surface of the bottom crown, but will also be placed under tension, which promotes the penetration of the studs of the machine's piston.

According to another advantageous characteristic, the inner surface of the conical wall incorporates brackets limiting the insertion of the shape of a capsule. This enables one to group batches of capsules by boxing them after their manufacture to supply them to roasters who load the capsules with coffee powder or infusion powder.

To sum up, the capsule according to the invention offers multiple advantages of reduction of polluting waste, of high quality of conservation of the product within the capsule, and of the possibility of a very great variety of appearance through the aesthetics endowed on the capsule by virtue of printing on the label foil covering the side wall of the capsules.

DRAWINGS

The invention herein will be described below in more detail, by virtue of examples of capsules illustrated in the appended drawings, in which.

DESCRIPTION OF ONE FORM OF IMPLEMENTATION OF THE INVENTION

Figure 1A:
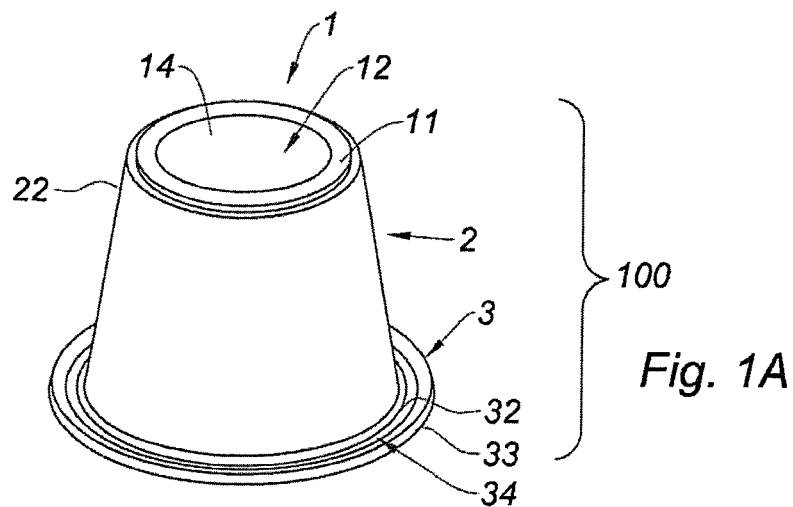
FIG. 1A is a view in perspective of one method of implementation of a capsule according to the invention, in the overturned position.
Figure 1B:
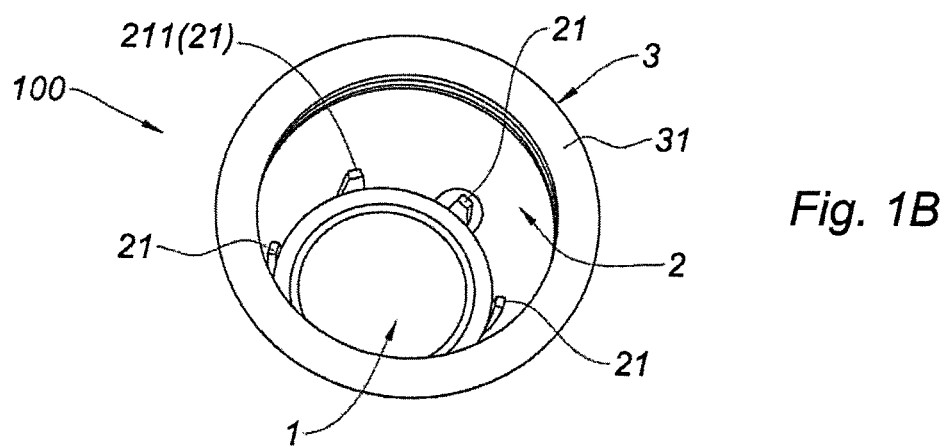
FIG. 1B is a view in perspective of the interior of the capsule before its filling and closure.

As illustrated in FIGS. 1A and 1B, the invention addresses a capsule 100 intended to accommodate a substance such as a coffee or tea powder for the preparation of a beverage. This capsule 100 is fitted into the housing of a coffee or infusion machine. It is held by a piston endowed with studs to penetrate the bottom of the capsule 100. The other side of the capsule covered by a membrane seal is traversed by the pin(s) injecting the water to impregnate the powder. The known machine itself is not shown.

The capsule 100 globally has a form of revolution or, more generally, it is rotationally symmetrical with respect to its axis XX. Although this example shows a capsule having a conical form of revolution—i.e. of circular cross-section—this form can also be rotationally symmetrical, with a polygonal cross-section.

The orientation chosen conventionally in the various Figures does not correspond to an imposed orientation, or the positioning of the capsule 100 within the machine. As a language convention, the small base or the summit of the frustoconical shape is bottom 1, and the large base—edged by the rim 3—is referred to as the top. Thus, in FIG. 1A, the capsule is illustrated in the overturned position in relation to the position of the capsule in the other illustrations.

The capsule 100 is composed of a frustoconical volume bounded by bottom 1, and a frustoconical wall 2 formed from one single cone frustum with a straight generatrix between the bottom 1 and the rim 3 surrounding the opening at the top of the capsule.

The flat bottom 1 is composed of an interior crown 11 connected to the side wall 2, and encloses a central opening 12 bounded by the interior rim 111 of the crown 11. The opening 12 left free by the central crown 11 corresponds to the surface for which the capsule 100—regardless of its orientation around the axis XX when it is positioned within the cavity in the machine—encounters studs that penetrate the bottom.

The bottom 1 is covered by a membrane seal 14 connected to the crown 11, on the interior side of the capsule, that will be pierced by the studs.

The upper edge of the frustoconical side wall 2 is connected to the rim 3, of which the upper face 31 is smooth (FIG. 1B). The lower face (FIG. 1A) is surrounded by a rigidifying crown 32 and an exterior crown 33 that itself surrounds the sealing lips 34 interacting with the sealing system of the machine's piston (FIG. 2A).

Figure 2A:
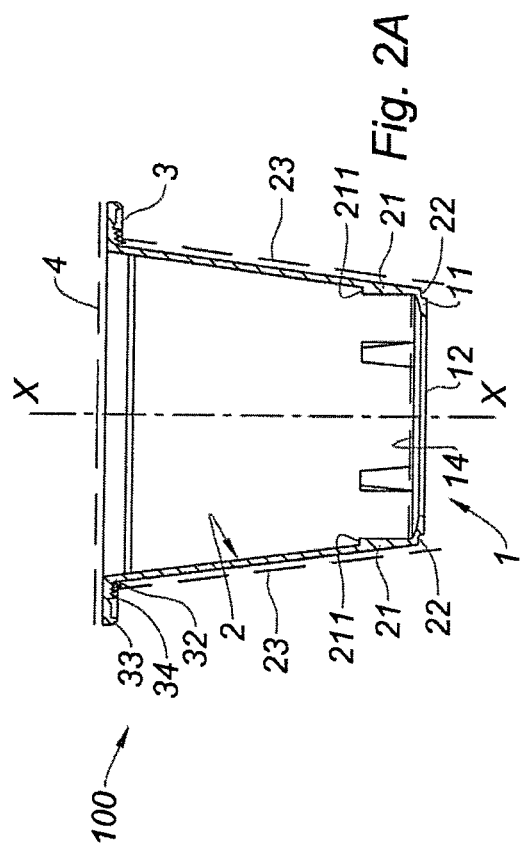
FIG. 2A is an axial cross-section of the capsule in FIG. 1.
Figure 2B:
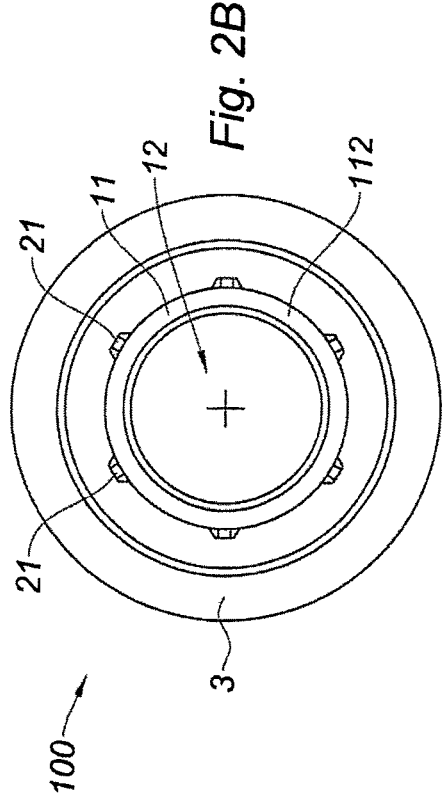
FIG. 2B is a top view of the capsule in FIG. 1.

According to FIGS. 1B, 2A, 2B, the interior surface of the frustoconical wall 2 incorporates—near the bottom—brackets 21, of which the top is a bearing surface 211 within a plane perpendicular to the axis XX, to accommodate the bottom rim 22 of the frustoconical wall 2 of a nested capsule.

FIG. 2A shows a schematic illustration, via non-continuous lines, of the label 23 surrounding the lateral frustoconical side wall 2 and the membrane seal 4 closing the top of the capsule and the interior membrane seal 14 capping the crown 11 and the central opening 12 of the bottom 1. These various impermeable covering parts are illustrated at a distance from the surfaces that they cover. In reality, they are pressed against them. The label 23 and the membrane seal 24—which are impermeable—will preferably be components formed from an aluminum filament, bearing printing where applicable.

The label 23 covering the side wall 2 is advantageously endowed with decorative printing—personalized where appropriate—that also bears information such as the origin, a production number, a date or other information concerning the content of the capsule.

FIG. 2B is a top view of the capsule 100, revealing the interior of the capsule without the membrane seal 14 and the brackets 21. This view of the capsule 100 shows the interior crown 11 with the inclined form of the frustoconical crown 112 of the interior rim 11 and the central aperture 12.

Figure 3:
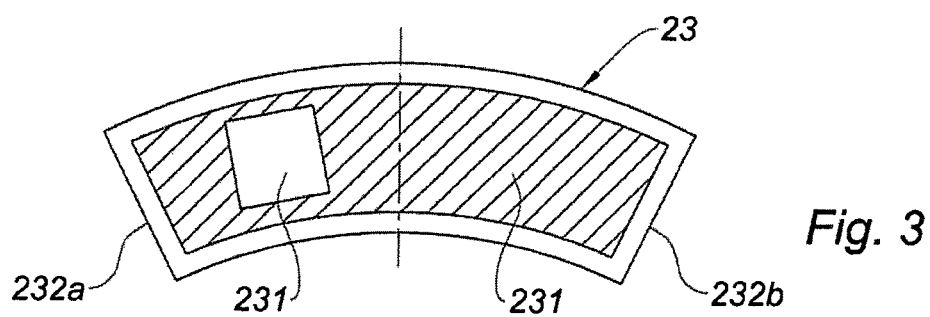
FIG. 3 is an illustration of a label covering the frustoconical wall of a capsule.

FIG. 3 shows a flat illustration of a label 23, which is a circular ring-shaped section. The label 23 has a printed or decorated surface 231. The extended form of the label 23 corresponds exactly to the form of the frustoconical surface of the wall 2, such that the similar edges—for example, the "radials" 232a and 232b—are connected exactly on a generatrix of the side wall 2 of the cone frustum for its impermeability. The edges 232a and 232b are not necessarily radial, and can have a different shape, with the sole proviso that the similar edges must be of complementary form so that they join with each other on the wall 2, without leaving a gap that would give rise to a non-impermeable area. The decorative pattern 231 is preferably such that there is continuity on the periphery of the wall 2.

The interior membrane seal 14 covering the bottom 1 is an aluminum foil that can bear markings and/or information, or can be a decorative or advertising-bearing surface. The membrane seal 14 is positioned within the cavity in the mold before the injection of the capsule.

The flat interior membrane seal 14 is pressed against the crown 11, to connect with the rim of the bottom rim (exterior side) of the label 23 covering the side wall 2, to connect with the interior of the capsule.

The membrane seal 4 covering the top and closing the capsule is positioned and joined to the rim 3 once the capsule has been filled with the product.

Figure 6:
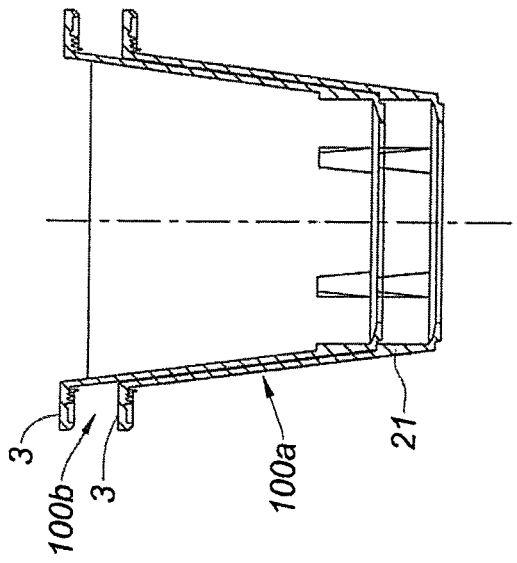
FIG. 6 is an axial cross-section of the nesting of two empty capsules.
Figure 4A:
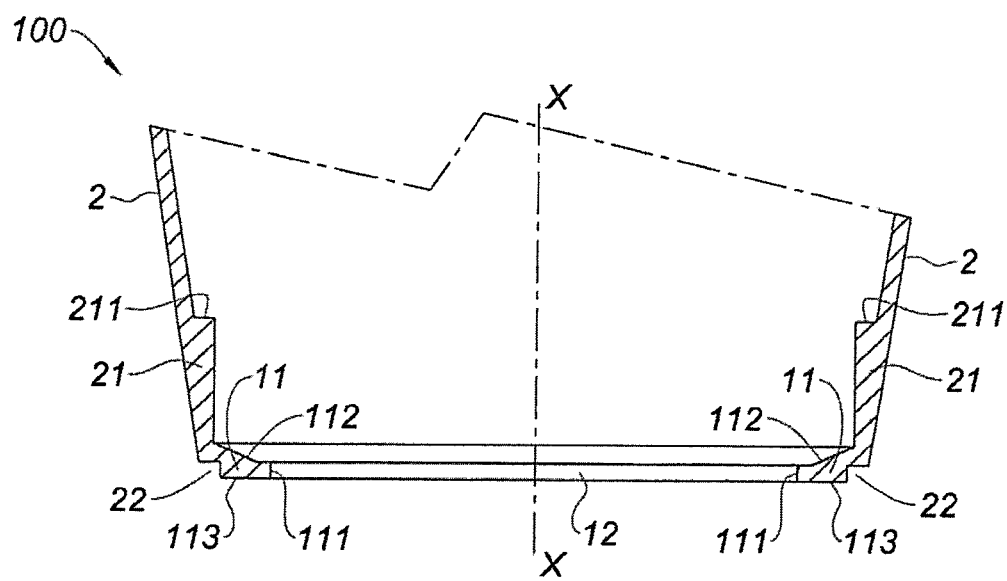
FIG. 4A is a cross-section of the bottom part of the capsule, without the membrane seal and without the label.

FIG. 4A shows an enlargement of an axial cross-section of the bottom part of the capsule 100, without either the label 23 or the membrane seal 14, showing the structure of the bottom 1, with its interior crown 11 and its interior rim 111, which is connected to the side wall 2 by means of a highly-belled-out frustoconical crown 112. Under this crown 112, there is the bottom rim 22 of the side wall 2. The bottom 113 of the crown 11 is flat. The bottom rim 22—which has an offset form—enables precise stacking of empty capsules 100a, 100b, such as illustrated in FIG. 6, preventing the bottom of a capsule sliding over a bracket and thereby jamming this capsule within the capsule accommodating it. This cross-section also shows the reinforcements provided by the brackets 21 combined with the interior crown 11, so that the side wall 2 properly withstands the thrust of the studs penetrating the membrane seal 14 without distorting the side wall 2, with the risk of jamming the capsule within the machine.

Figure 4B:
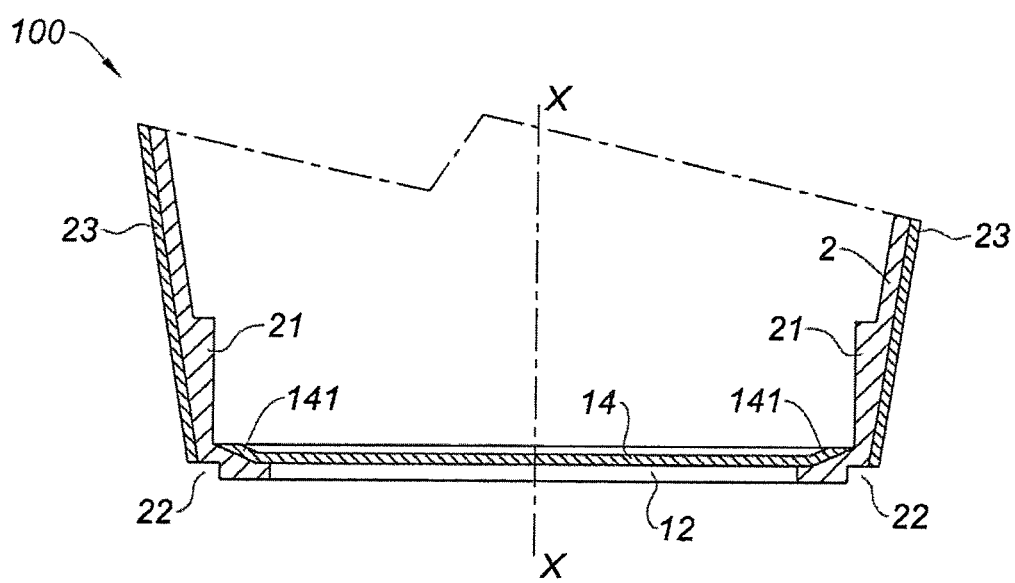
FIG. 4B is a view similar to that of FIG. 4a with the label and the membrane seal.

FIG. 4B, which is a cross-section similar to FIG. 4A, shows the label 23 covering the side wall 2 as far as the bottom rim 22, as well as the interior membrane seal 14 connected to the frustoconical crown 112, as far as rim 111 and covering the central opening 12.

The membrane seal 14, which is heated by the temperature of the injection mold, shrinks during cooling when the injected capsule is released from the mold, so that the part of the membrane seal covering the central opening 12 extends, which is advantageous for the appearance and for facilitating the piercing by the machine's studs.

Figure 5A:
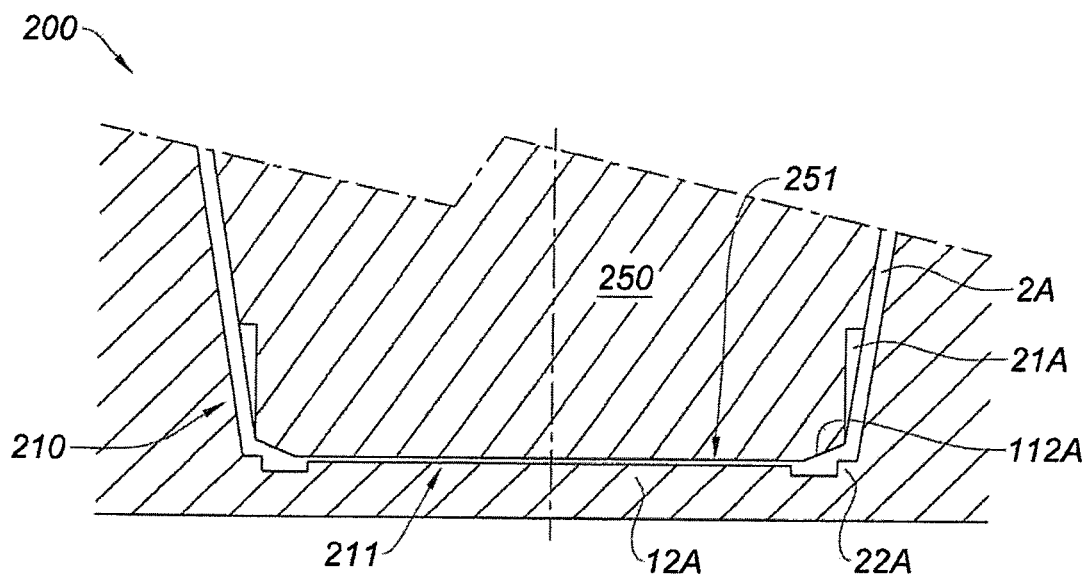
FIG. 5A is a cross-section of the lower part of an injection mold, which is closed but empty.
Figure 5B:
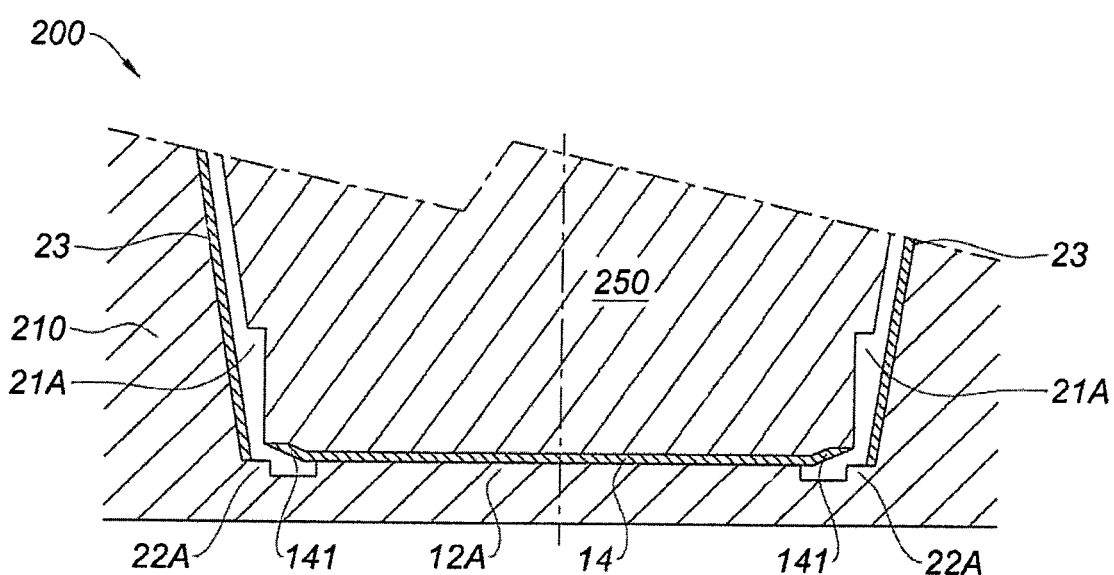
FIG. 5B is a cross-section like the one in FIG. 5a, with the label and the membrane seal in position, before injection molding.

FIGS. 5A and 5B show a closed, empty injection mold 200 (FIG. 5A), and the same mold when closed and empty but with the label 23 and the membrane seal 14 positioned before the injection of the material (FIG. 5B). The empty part of the injection mold 200 bears the same references as the corresponding parts of the capsule, with the suffix A.

The injection mold 200 according to this example is composed of one part with the cavity 210 corresponding to the shape of the exterior surface of the capsule, and one part in relief forming the core 250 endowing the shape of the interior surface of the capsule. The means of securing of the label 23 and the membrane seal 14 within the mold—by depression, for example—are not illustrated.

The cavity 210 incorporates a bottom 211 of which the central part 12a is in relief so as to form the central aperture 12, since the membrane seal 14 will be on the inside and not the outside of the capsule. The edge of the bottom 211 incorporates a peripheral relief 22A to produce the rim 22 of the capsule. This relief with sharp edge towards the exterior forms a shoulder for precisely positioning the bottom edge of the label 23 (FIG. 5B).

The core 250 has a peripheral wall receded from the top of the relief 12A of the cavity 250, to take account of the thickness of the membrane seal. The core 250 also has hollow areas 21A to form the brackets 21.

The bottom 251 is surrounded by the frustoconical form 112A, to produce the thickness of the frustoconical crown 112 on the bottom edge 22 and the peripheral relief 22A.

FIG. 5B shows the closed mold 200 after the insertion of the label 23 and the membrane seal 14. The label 23 presses, at its lower edge, against the relief 22A and the membrane seal 14 is held tightly between the bottom 251 of the core and the top of the relief part 12A of the cavity, so that it is sufficient to set the exterior edge 141 of the membrane seal 14 against the frustoconical surface 212A of the core 250 for the material not to pass between the edge 141 of the membrane seal and the frustoconical surface 12A of the core 250.

FIG. 5B shows that the entire surface of the capsule is thus covered by the label 23 and the membrane seal 14, ensuring that the capsule is hermetically sealed.

It should also be noticed that the membrane seal 14 is tightened between the core 250 and the bottom 12A of the cavity 210, such that it is effectively brought to the temperature of the mold so as to subsequently procure the shrinkage of the membrane seal 14 and its placement under tension through the cooling of the capsule released from the mold.

The process of production of a capsule 100 with the mold described above consists in producing a capsule mold so as to perform injection molding with it.

Before the injection of the capsule, the label 23 is secured within the cavity of the mold and the interior membrane seal 14 is secured to the core, each time in the respective position of the label 23 and the membrane seal 14 within the capsule once finished.

The two components 23, 14 are held in place by depression, for example, to prevent the local detachment of one or other of the components and passage of the material to be injected under the foil of the label or membrane seal.

After the closure of the mold 200, the plastic material is injected.

The mold 200 typically incorporates several ensembles such as described above, namely multiple cavities and as many associated cores.

FIG. 6 is a cross-section showing the nesting of two capsules 100a and 100b. The capsules are nested after their manufacturing and prior to filling.

The description of the second and third methods of implementation below uses the same numeric references for the same components, with the suffix (a) for the first method of implementation and the suffix (b) for the second method of implementation.

Figure 7:
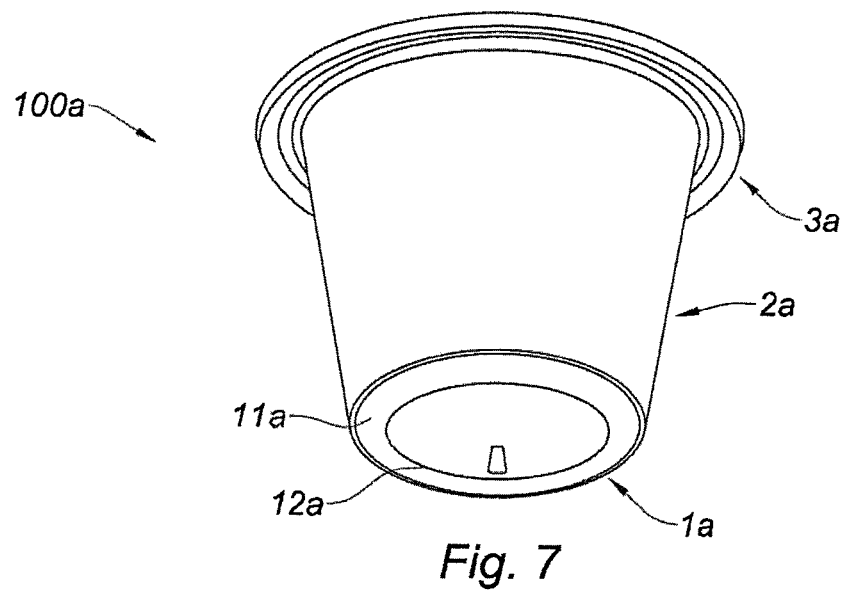
FIG. 7 is an in-perspective top view of the second method of implementation of the capsule according to the invention.
Figure 8:
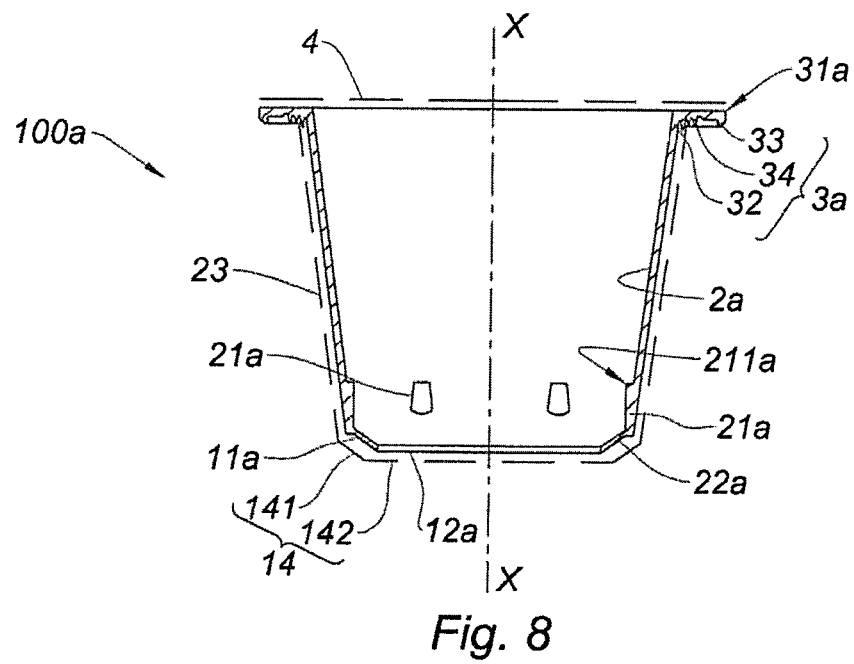
FIG. 8 is an axial cross-section of the capsule in FIG. 7.

FIGS. 7 and 8 show the second method of implementation of a capsule 100a designed to accommodate a substance such as a coffee or tea powder for the preparation of a beverage. This capsule 100a is installed within the housing of a coffee or infusion machine. It is held by a piston 300 (FIG. 15) endowed with studs 310 to pierce the bottom of the capsule 100a. The other side of the capsule—which is covered by a membrane seal—is traversed by the pin(s) injecting the water to impregnate the powder. The machine is not shown, being already known.

The orientation chosen conventionally in the various Figures is not an imposed orientation or that of the positioning of the capsule within the machine. In the orientation in the Figures, the bottom part is the bottom and the top part is the top.

FIG. 7 shows the capsule 100a, which is essentially of a revolution form in relation to its axis XX.

The capsule 100a is composed of a frustoconical cavity bounded by the bottom 1a and a frustoconical wall 2a formed from a single cone frustum with straight generatrix between the bottom 1a and the rim 3a surrounding the opening at the top of the capsule.

The open bottom 1a is formed from a frustoconical crown 11a connected to the side wall 2a and surrounding its circular central opening 12a. As shown in FIG. 4A, the bottom edge 111 of the frustoconical crown 11—which is also the interior rim bounding the opening 12—partially outlines a plane.

The upper edge of the frustoconical side wall 2a is connected to a rim 3a of which the upper face 31a is smooth. The bottom face is surrounded by a rigidifying crown 32a extending beyond the exterior crown 33a, which itself surrounds the sealing lips 34a interacting with the sealing system of the machine's piston.

The interior surface of the frustoconical wall 2a incorporates—near the bottom—brackets 21a of triangular cross-section with a bearing surface 211a on the top. The bearing surface 211a forms a plane perpendicular to the axis XX, to accommodate the bottom edge 22a of the frustoconical wall 2a of a nested capsule.

FIG. 8 is a schematic illustration of the label foil 23 surrounding the frustoconical side wall 2a, and the membrane seal 4a closing the top of the capsule and the membrane seal 14a capping the bottom of the capsule, including the frustoconical crown 11a and the central opening 12a of the bottom 1a. These various covering parts are illustrated at a distance from the surfaces that they cover. In reality, they are pressed against them.

The label foil 23 covering the side wall 2a is an aluminum foil advantageously endowed with decorative printing—personalized where appropriate—that also contains information such as the origin, a production number, a date or other information about the content of the capsule.

Figure 10:
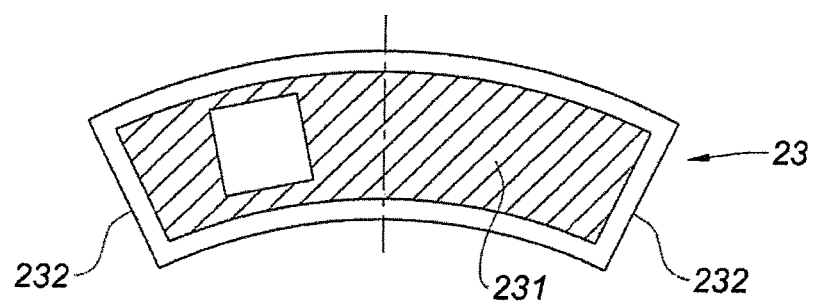
FIG. 10 is an illustration of a label foil covering the frustoconical wall of a capsule.

FIG. 10 shows the flat extension of a label foil 23, which is a ring-shaped section. The label foil 23 incorporates a printed or decorated surface 231. The extended shape of the label foil 23 exactly matches the shape of the frustoconical surface of the wall 2a, so that the "radial" edges 232 connect to each other exactly on a cone frustum generatrix. The decorative pattern 231 is preferably such that there is continuity over the periphery of the wall 2a.

The label foil 23 is incorporated into the frustoconical wall 2a at the moment of injection molding. For this, it is placed in the cavity in the injection mold, and one then injects the plastic to form the capsule and render the label foil integral with the frustoconical wall of the capsule.

The membrane seal 14 covering the bottom 1 positioned after the injection of the capsule is heat-sealed.

The flat membrane seal 14—which will preferably be embossed—is folded against its central disc 141 and its ring-shaped rim 142 is pressed against the frustoconical crown 11a, to connect with the label foil 23 covering the side wall 2a. The circular disc 141 covers the opening 12a of the bottom.

The membrane seal 4 covering the top is positioned and secured to the rim 3a once the capsule has been loaded with product.

Figure 9:
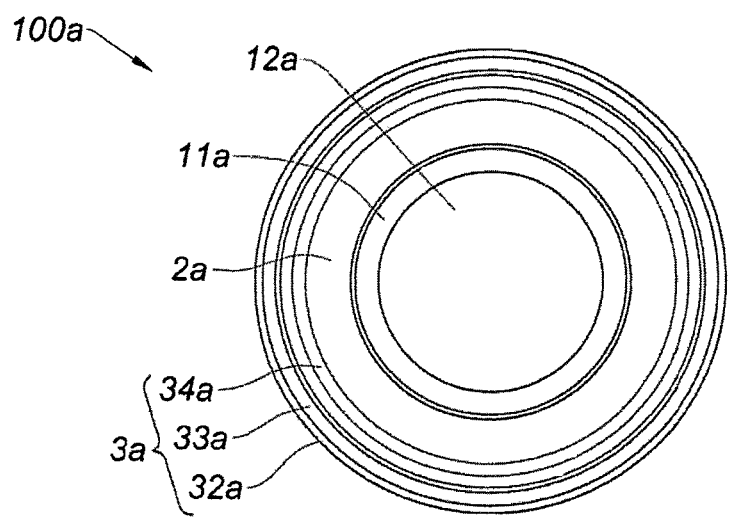
FIG. 9 is a top view of the capsule in FIG. 7, showing the interior structure.

FIG. 9 is a top view of the capsule 100a, showing the flattened frustoconical crown 11a bounding the opening 12a of the bottom, the side wall 2a and the bottom of the rim 3a, with its rigidifying crown 32a, its exterior crown 33a, and its sealing lips 34a.

FIG. 8 shows the interior of the capsule, with the brackets 21a on the interior surface of the frustoconical wall 2a.

Figure 11:
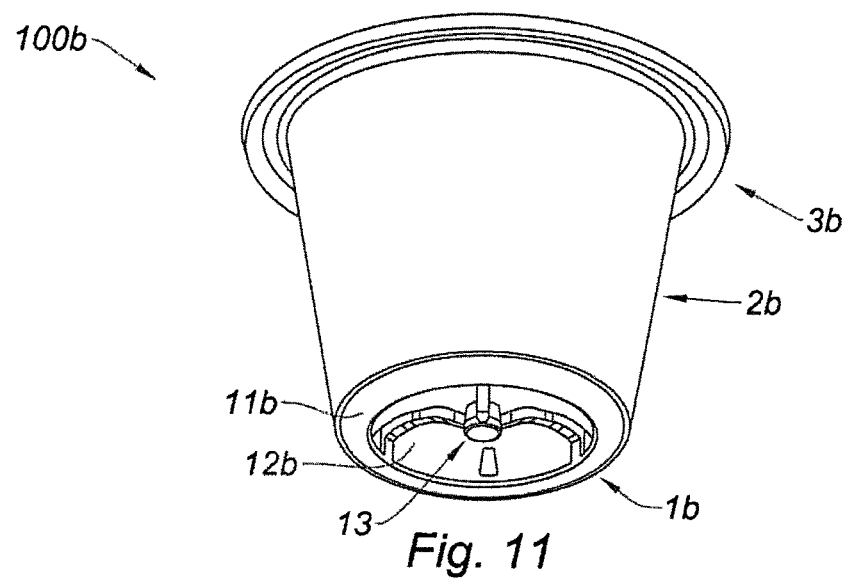
FIG. 11 is an in-perspective top view of a third method of implementation of a capsule according to the invention.
Figure 12:
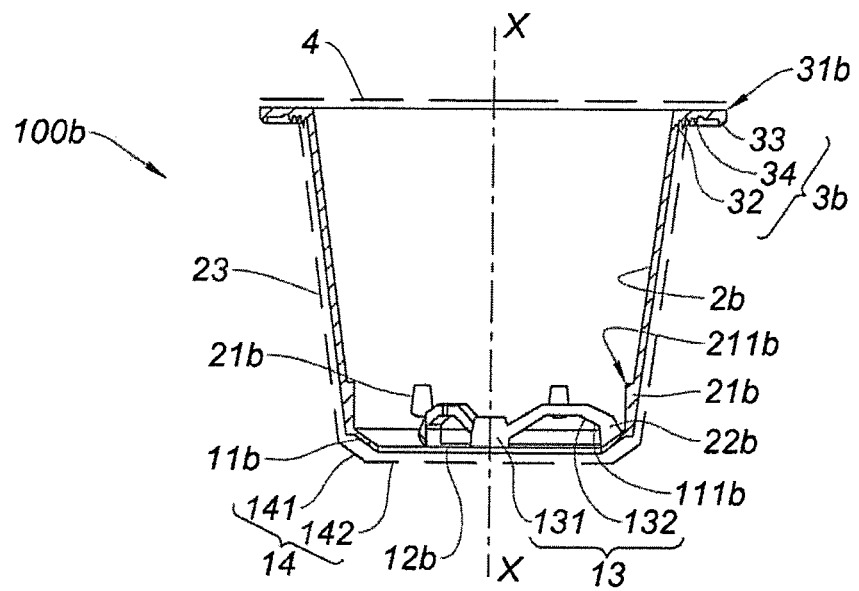
FIG. 12 is an axial cross-section of the capsule in FIG. 11.

FIGS. 11 and 12 show the third form of implementation of the capsule 100b without the membrane seal that normally covers its bottom. The capsule has essentially a revolution form in relation to its axis XX.

The parts of the capsule 100b of this third form of implementation—which corresponds to the second form of implementation—have the same numeric references, with the suffix (a) being replaced by the suffix (b). The parts that are different have numeric references without a suffix. Such is the case for the label foil 23 and the membrane seal 4 covering the top, and for the membrane seal 14 covering the bottom 1a.

The capsule 100b is composed of a frustoconical cavity bounded by the bottom 1b and a frustoconical wall 2b composed of a single cone frustum with straight generatrix between the bottom 1b and the rim 3b surrounding the opening at the top of the capsule.

The open bottom 1b is composed of a frustoconical crown 11b joined to the side wall 2b and surrounding the circular central opening 12b of the bottom. This opening within the crown 11b is occupied by cross brace 13 composed of a hub 131 with branches 132 that connect it to the frustoconical crown 11b. The bottom edge 111b of the frustoconical crown 11b, which is also the interior edge bounding the opening 12b, and the cross brace 13 partially define a plane.

The inwardly-curved branches 132 connected to the rear of the frustoconical crown 11b are equally distributed around the axis XX of the capsule. The branches 132 are preferably radial.

Figure 15:
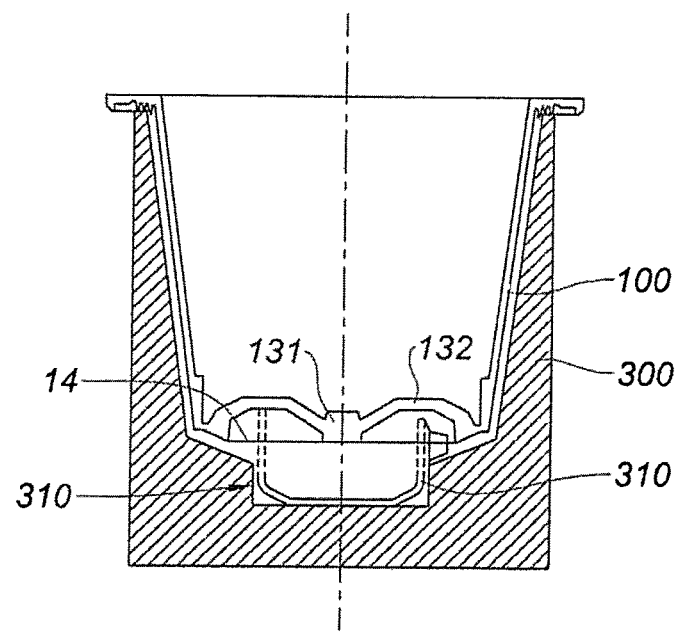
FIG. 15 is a schematic cross-section of the capsule in FIG. 11, in the coffee machine's piston.

The branches 132 of the hub are inwardly curved so as to enter the volume within the capsule and be positioned at a distance from the plane of the bottom that is sufficient to prevent the studs 310 of the machine's piston 300 are not likely to touch either of the branches 132, in accordance with the random orientation of the capsule placed in the machine (see FIG. 15).

The upper edge of the frustoconical side wall 2b is connected to a rim 3b, of which the upper face 31b is smooth. The bottom face is surrounded by a rigidifying crown 32b beyond the exterior crown 33b itself surrounding the sealing lips 34b interoperating with the sealing system of the machine's piston 310.

The cross brace 13 is used for the injection of the plastic into the capsule's mold; the hub 131 corresponds to the point of arrival of plastic in the mold, which is then distributed by the branches 132 towards the frustoconical crown 11b and the side wall 2b to the rim 3b. The branches 132 are regularly oriented around the axis of revolution XX, and their cross-section is appropriate to allow the passage of the plastic under pressure, so that it arrives easily at the locations most distant from the injection point, in the sealing lips of the bottom of the capsule's rim 3b.

The interior surface of the frustoconical wall 2b incorporates—near the bottom—brackets 21b of triangular cross-section with, on the bottom, a bearing surface 211b. The bearing surface 211b forms a plane perpendicular to the axis XX, to accommodate the bottom edge 22b of the frustoconical wall 2b of a nested capsule, so that its bottom 1b is located above the inwardly-curved branches 132 of the capsule within which it is positioned, and so on.

FIG. 12 shows a schematic illustration of the label foil 23 surrounding the frustoconical side wall 2b, as well as the membrane seal 4 forming the top of the capsule and the membrane seal 14 capping the bottom of the capsule, including the frustoconical crown 11b and the central opening 12b of the bottom 1b. These various covering parts are illustrated at a distance from the surfaces that they cover. In reality, they are pressed against them.

The label foil 23 covering the side wall 2b is, as already stated, an aluminum foil advantageously embellished with decorative printing—personalized where appropriate—that also contains information such as the origin, a production number, a date, or other information about the content of the capsule.

The label foil 23 is incorporated into the frustoconical wall 2 at the moment of injection molding. For this, it is placed in the cavity of the injection mold, and the plastic is then injected to produce the capsule and also render the label foil integral with the frustoconical wall of the capsule.

The membrane seal 14 covering the bottom 1b is positioned after the injection of the capsule, because the opening 12b at the bottom enables the positioning of the movable parts of the injection mold, which are not illustrated. The membrane seal 14 is then heat-sealed to the frustoconical crown 11b.

The flat membrane seal 14—which is preferably embossed—is folded against its central disc 141 and its ring-shaped edge 142 is pressed against the frustoconical crown 11b, to connect with the label foil 23 covering the side wall 2b. The circular disc 141 covers the opening 12b of the bottom, and presses against the bottom surface of the hub 131.

The membrane seal 4b covering the top is positioned and secured to the rim 3b once the capsule has been filled with product.

Figure 13A:
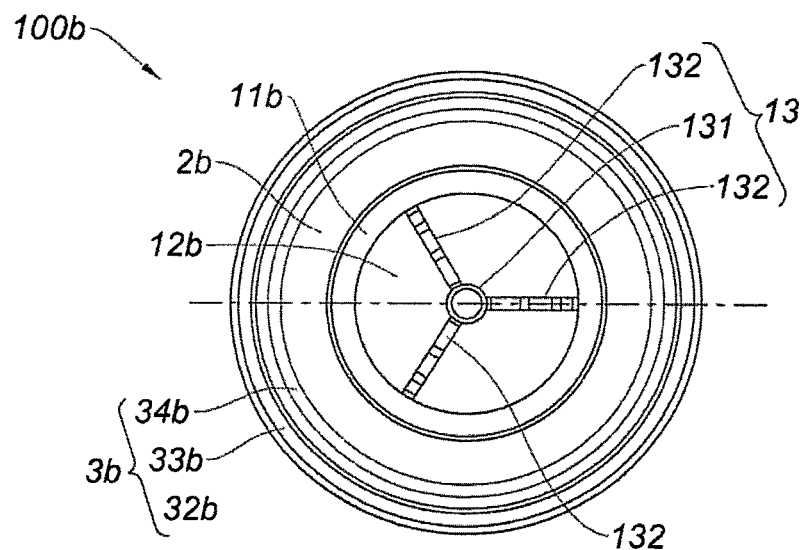
FIG. 13A is a bottom view of the capsule in FIG. 11.

FIG. 13A is a top view of the capsule 100b showing the cross brace 13 composed of three branches 132 distributed at equal angles, with the flat frustoconical crown 11b bounding the opening 12b of the bottom, the side wall 2b and the bottom of the rim 3b, with its rigidifying crown 32b, its exterior crown 33b and its sealing lips 34b.

Figure 13B:
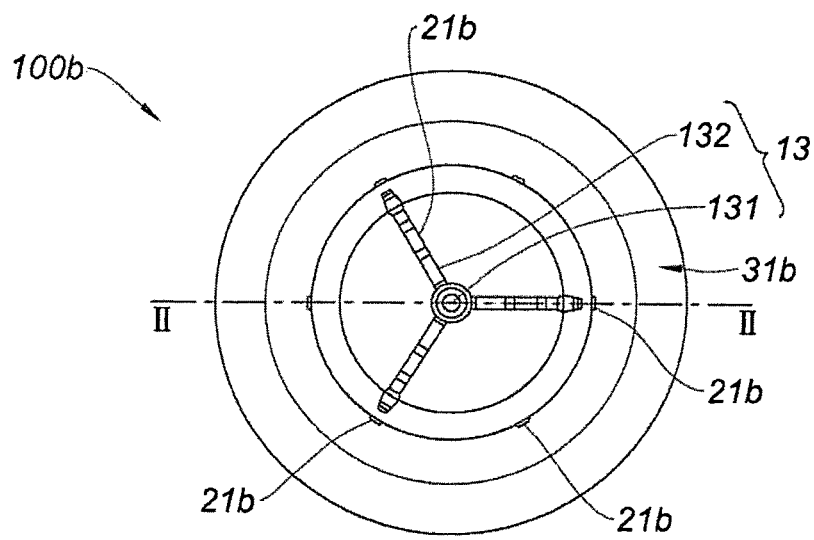
FIG. 13B is a top view of the capsule in FIG. 11.

FIG. 13B is a top view of the capsule 100b, showing the interior of the capsule with the cross brace 13, its hub 131, its three branches 132, and the brackets 21b. Certain brackets 21b are preferably positioned on the interior surface of the frustoconical wall 2b, in the same radial plane as the branches 132 of the cross brace. Other brackets 21b are in an intermediate position, so as to have six brackets 21b forming a regular bearing surface within the capsule 100b.

Figure 14:
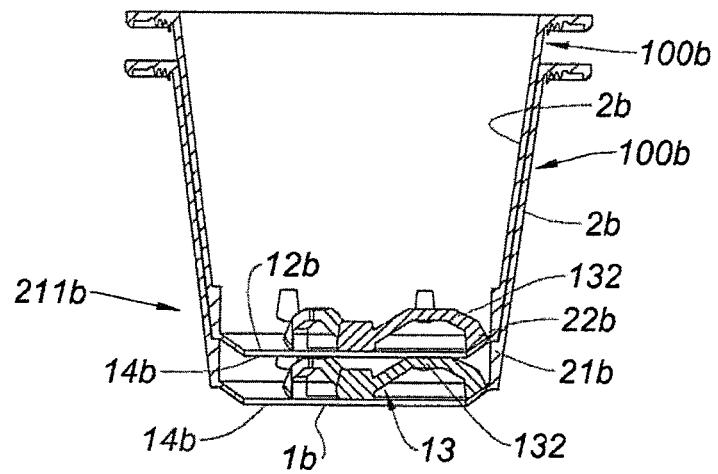
FIG. 14 is an axial cross-section of the nesting of two empty capsules in accordance with FIG. 11.

FIG. 14 is a cross-section showing the nesting of two capsules 100b (or 100a). The capsules are nested after their manufacture and before filling. The bottom of the capsules is, at this time, already fitted with the membrane seal 14. The bearing surface 211b of the brackets 21b is located at sufficient height for the downwardly-pressed capsule 100b, which bears via the bottom edge 22b of its frustoconical wall 2b against the bearing surface 211b of the brackets 2lb of the wall 2b, namely such that the surface of the membrane seal 14 covering the opening 12b of the bottom is level and, preferably, above the highest part of the branches 132 of the cross brace 13, so that the membrane seal 14 is unlikely to be damaged or dented by a branch 132 of the cross brace 13 of the capsule 100 in which it is nested.

FIG. 15 shows a schematic illustration of the machine's piston 300 with its studs 310l salient at the moment of closure of the chamber in which the capsule 100 has been placed. The studs 310 pierce the membrane seal 14 to allow liquid to pass through, but they do not touch the branches 132 of the cross brace, and are unlikely to distort the capsule and cause it to become jammed in the piston 300.

The references used in the description will be simplified in the claims, and are restricted to the numeric part only.

PARTS LIST OF PRINCIPAL COMPONENTS (Without the Literal References)
100 Capsule
1 Bottom of capsule
11 Interior crown/frustoconical crown
111 Interior rim/bottom edge
112 Frustoconical crown
113 Flat exterior surfaces
12 Central opening 13 Cross brace
131 Hub
132 Branch
14 Interior membrane seal of bottom
141 Edge of the membrane seal
142 Central disc
2 Frustoconical side wall
21 Bracket
211 Bearing surfaces
22 Bottom edge
23 Label/foil label
231 Printed surfaces
232a,b Edges of the label
3 Rim of the capsule
31 Upper surface
32 Rigidifying crown
33 Exterior crown
34 Sealing lips
4 Membrane seal of capsule top
200 Injection mold
210 Cavity
211 Bottom
212A Frustoconical surface
250 Core
251 Top of core
2A Gap
12A Relief of bottom of the cavity
21A Hollow
300 Piston
310 Stud
22A Peripheral relief
112A Frustoconical surface

The invention claimed is:

1. A capsule designed to accommodate a substance for preparation of a beverage when the capsule is inserted into a housing in a coffee machine or infusion machine, the capsule to be held therein by a piston during passage of an extracting liquid through the capsule, after the capsule is pierced by studs on the piston:
the capsule being made of injected plastic and having a bottom (1) and a side wall (2) essentially fitting within a cone frustum, and a rim (3) that may be covered by a membrane seal (4) after a substance is loaded into the capsule;
the said capsule being characterized by the fact that:
the side wall (2) is formed from a single cone frustum with a straight generatrix between the rim (3) and the bottom (1);
the bottom (1) is flat, composed of an interior crown (11) connected to the side wall (2) and surrounding a central opening (12);
the side wall (2) is covered with a sealed label (23), and the bottom (1 and the central opening (12) are covered with a membrane seal (14).

2. The capsule in accordance with claim 1, wherein the membrane seal (14) is an interior membrane seal.

3. The capsule in accordance with claim 1, wherein the label (23) and the membrane seal (14) are integral.

4. The capsule in accordance with claim 1, wherein the central opening (12) of the bottom (1) is circular.

5. The capsule in accordance with claim 1, further comprising a cross brace (13) composed of a central hub (131) that is connected to the interior crown (11) by branches (132) entering the volume of the capsule so as not to be touched by the studs.

6. The capsule in accordance with claim 5, wherein the branches (132) are radial.

7. The capsule in accordance with claim 1, wherein the interior crown (11) has a flattened frustoconical shape.

8. The capsule in accordance with claim 1, wherein the label (23) and the membrane seal (14) comprise aluminum foil, and the membrane seal is notably embossed.

9. The capsule in accordance with claim 1, wherein the label (23) and the membrane seal (14) comprise a complex composed of an aluminum or ethylene vinyl alcohol film wherein the film has two surfaces and the two faces are covered with a plastic film chosen from the group consisting of polypropylene and polylactic acid.

10. The capsule in accordance with claim 1, wherein the label (23) is of a greater height than a height of the side wall (2), so that the upper edge of the label—which overhangs—is incorporated into the rim (3) of the capsule when the capsule is produced by injection molding.

11. The capsule in accordance with claim 1, wherein the bottom (1) includes an inwardly-turned peripheral edge (22) that provides a bearing point for stacking empty capsules.

12. The capsule in accordance with, claim 1, wherein the interior crown (11) has a flat exterior surface (113) and a frustoconical interior surface (112).

13. The capsule in accordance with claim 1, wherein the side wall (2) includes an interior surface, and wherein the interior surface includes brackets (21) that limit the extent of insertion of a nested capsule.

14. A production process for the capsule in accordance with claim 1, the process comprising the steps of:
providing a mold (200) for a capsule, the mold (200) comprising a cavity (210) and a core (250), wherein the cavity (210) has frustoconical side walls and a bottom (211) that is endowed with a surface in relief (12A),
placing a label (23) on the frustoconical side walls of the cavity (210),
placing a membrane seal (14) into the mold (200),
closing the mold (200), and
injecting a plastic to form a capsule.

15. The process of claim 14, wherein the step of placing a membrane seal (14) into the mold (200) includes the step of placing the membrane seal (14) on the core (250).

16. The process of claim 14, wherein the label (23) and the membrane seal (14) are rendered integral by the process.

17. The capsule in accordance with claim 1, further comprising a cross brace (13) composed of a central hub (131) that is connected to the interior crown (11) by branches (132), wherein the side wall (2) includes an interior surface, and wherein the interior surface of the side wall (2) includes brackets (21).

18. The capsule in accordance with claim 17, wherein the brackets (21) have a bearing surface (211) above the cross brace (13).

* * * * *